Aug. 30, 1938.    O. L. KOCH ET AL    2,128,749
SPELLING GAME
Filed Oct. 22, 1936
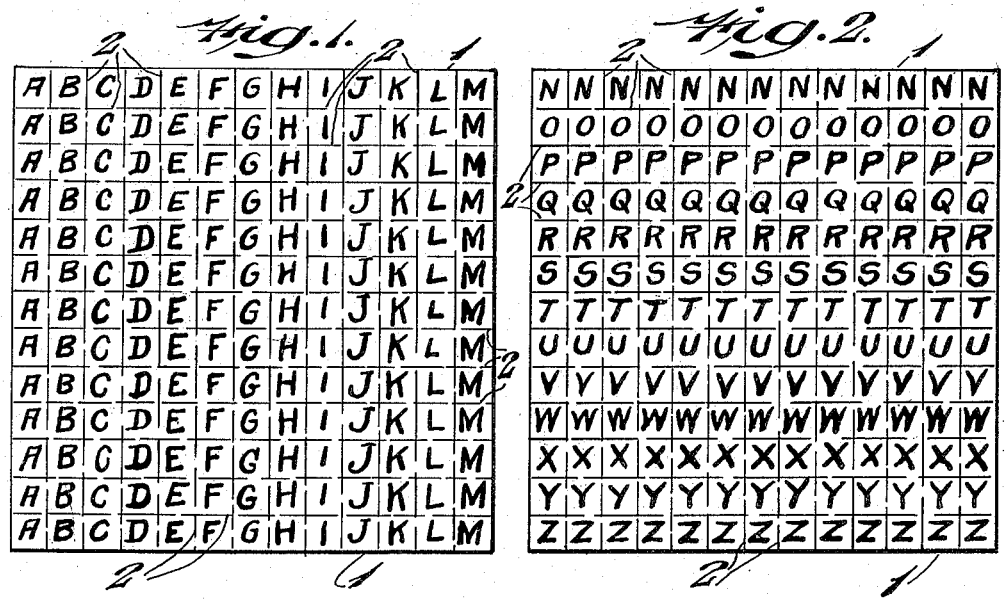
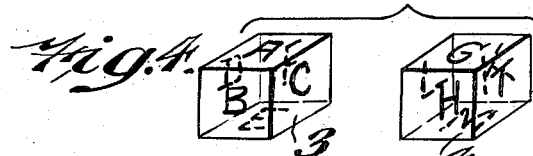
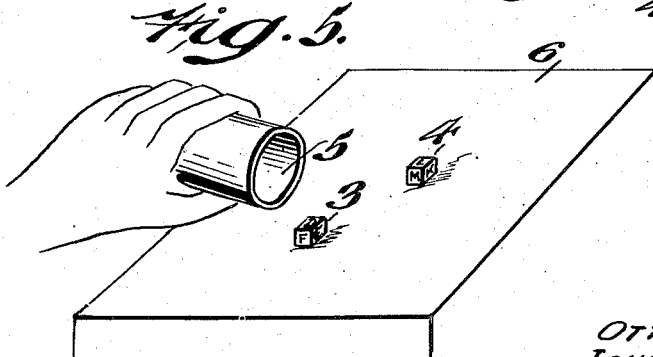
|    |    |
|----|----|
| 1 PUT | 1 KIT |
| 2 PAT | 2 CUT |
| 3 PET | 3 CAT |
| 4 RAT | 4 LAP |
| 5 MAT | 5 LET |
| 6 CAT | 6 MOP |
| 7 FAT | 7 NAP |
| 8 SAP | 8 MET |
| 9 LAP | 9 —— |
| 10 LET | 10 —— |
INVENTORS.
OTTO LUDWIG KOCH,
JOHN DUKE CRUMLEY,
DONALD ELDER
BY Wm. G. Schmidt
ATTORNEY.

Patented Aug. 30, 1938

2,128,749

UNITED STATES PATENT OFFICE 2,128,749

SPELLING GAME

Otto Ludwig Koch, John Duke Crumley, and Donald Elder, Philadelphia, Pa.

Application October 22, 1936, Serial No. 106,956

1 Claim. (Cl. 273—135)

This invention relates to a game apparatus and more particularly to a game which emphasizes educational benefits in a pleasurable manner.

Its primary object is to entertain young children, not only in a competitively pleasant way, but at the same time to extend to them an opportunity to acquire a more comprehensive knowledge of alphabetical letters and their application to word building.

A secondary object of the invention is to afford similar pleasant and educational expression to those who are more mature since frequently, in a social gathering, adults like to play those games that stir up pleasant childhood memories and activities.

Other objects and purposes will become disclosed as the description of the game and its rules are developed.

Fig. 1 represents the obverse side of a perforated card on which certain letters of the alphabet are inscribed.

Fig. 2 represents the reverse side of the perforated card on which the remaining letters of the alphabet are inscribed.

Fig. 3 represents a perspective view of the letters in Fig. 1 as separated and stacked in groups.

Fig. 4 is a perspective view of the two cubical elements on the faces of which certain letters are inscribed.

Fig. 5 is a perspective view of the cubical elements as they align themselves on the game table.

Fig. 6 is a sample of the three lettered words that may be constructed during the progress of the game.

Referring to the drawing in which like numerals indicate like parts, Fig. 1 is a square of card board 1 or other suitable material on which the letters A, B, C, D, E, F, G, H, I, J, K, L and M are inscribed in vertical columns of thirteen letters to a column. The card board 1 is perforated longitudinally and transversely along the sample lines 2. In Fig. 2 the reverse side of the card board 1 is shown on which the letters N, O, P, Q, R, S, T, U, V, W, X, Y and Z are inscribed in horizontal rows of thirteen letters to a row. When the card board 1 is broken apart along the perforations, as indicated by 2, thirteen stacks of letters A to M are built up. On the reverse side of a square marked A is the so called surprise letter N. On the reverse side of another square bearing the indicia A is the surprise letter O. The same arrangement of obvious and surprise letters is true of the other stack letters B, C, D, down to M. In other words, the letters N, O, P, down to X, Y and Z will all appear on the reverse sides of the various squares constituting the stacks of letters from A to M. The squares A—and the same is true of B, C, D, etc.—contain among their number on their reverse sides the letters N, O, P, Q, R . . . X, Y, Z.

In Fig. 3 are two cubical elements which simulate dice in that the six faces of cubical element 3 have inscribed thereon letters A, B, C, D, E and F and the cubical element 4 has inscribed on its six faces the letters G, H, I, K, L and M. The letter J is purposely omitted from the faces of the two cubical elements. To play the game the cubical elements are placed by a player into the cup or receptacle 5, are shaken thoroughly, and then thrown upon the table top 6. As indicated in the drawing, the letters D and L appear uppermost. The player is then entitled to use the letters D and L for the building of a word. However, he has the privilege of using the letters on the reverse side of D and L as they appear in the stacks. It may be that the D he plucks from the stack has, on its reverse side, the letter U; and the L, on its reverse side, the letter R. The player therefore has a choice of two letters out of four for the purpose of constructing a word. The player may, at any time, select the letter J (a free letter) either for the purpose of using J, or for the advantage of using the surprise letter, perhaps an O, that may appear on the reverse side of the J that he has chosen. After the first player has had his chance with the cubical elements, the second player then proceeds to toss the elements for his letters.

Although the game has been described in terms of two players, it is obvious that many more than two can play the game either as individuals competing for themselves, or as members of teams which are contesting with one another.

In Fig. 6 is a sample of the way in which three lettered words can be constructed during the progress of the game. In other words, the first player has, by means of tossing the cubical elements and by means of judiciously using the obverse or reverse sides of the small cards selected, and of the free letter J with its surprise letters, constructed the words; put, pat, pet, rat, mat, fat, sat, lap, and let, while the second player has been building eight words ranging from "kit" to "met". The player, or the group of players, that succeeds in constructing a given number of words of variable length or of given length most quickly is the winning player or group.

The game has unlimited opportunities for an ideal combination of fun and instruction, and the aforesaid description is not to be construed as a curtailment of its scope or its application under all possible conditions, but as merely illustrative of its potentialities.

Having thus described our invention, what we claim as new and desire to secure by Letters Patent is:

A game apparatus comprising two cubical elements on the six faces of each are inscribed the letters A, B, C, D, E, F and G, H, I, K, L, M, respectively; and thirteen groups of cards lettered A, B, C, D, E, F, G, H, I, J, K, L and M, said groups consisting of thirteen cards each and on the reverse sides of said thirteen cards in every group are inscribed the letters N, O, P, Q, R, S, T, U, V, W, X, Y and Z, said cards lettered J to be used at any time throughout the progress of a game as a letter J or as the surprise letter indicated on the reverse side for the purpose of constructing words from the groups of lettered cards as indicated by the throw of said two cubical elements.

OTTO LUDWIG KOCH.
JOHN DUKE CRUMLEY.
DONALD ELDER.